United States Patent
Yogeswaren

(10) Patent No.: US 12,360,276 B2
(45) Date of Patent: Jul. 15, 2025

(54) ACOUSTIC PHASED ARRAY SYSTEM AND METHOD FOR DETERMINING WELL INTEGRITY IN MULTI-STRING CONFIGURATIONS

(71) Applicant: Baker Hughes Oilfield Operations LLC, Houston, TX (US)

(72) Inventor: Elan Yogeswaren, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 215 days.

(21) Appl. No.: 17/825,780

(22) Filed: May 26, 2022

(65) Prior Publication Data
US 2022/0390637 A1    Dec. 8, 2022

Related U.S. Application Data

(60) Provisional application No. 63/195,914, filed on Jun. 2, 2021.

(51) Int. Cl.
 *G01V 1/50*  (2006.01)
 *E21B 47/005*  (2012.01)

(52) U.S. Cl.
 CPC .............. *G01V 1/50* (2013.01); *E21B 47/005* (2020.05); *G01V 2210/129* (2013.01);
 (Continued)

(58) Field of Classification Search
 CPC .............. G01V 1/50; G01V 2210/129; G01V 2210/1429; G01V 2210/6222;
 (Continued)

(56) References Cited

U.S. PATENT DOCUMENTS 4,701,891 A * 10/1987 Castagna ................. G01V 1/46
                                                              702/11
5,640,371 A    6/1997 Schmidt
(Continued)

FOREIGN PATENT DOCUMENTS

WO    2009/006305    1/2009

OTHER PUBLICATIONS https://www.merriam-webster.com/dictionary/may (Year: 2024).*
(Continued)

*Primary Examiner* — Tung S Lau
(74) *Attorney, Agent, or Firm* — Hogan Lovells US LLP

(57) ABSTRACT

An acoustic logging system includes a first transducer in contact with or in close proximity to a sound barrier configured to emit a beam of acoustic energy according to a first mode of operation or a second mode of operation. The system also includes one or more second transducers in contact with or in close proximity to the sound barrier, positioned axially away from the first transducer, configured to receive acoustic energy from a wellbore environment responsive to the beam. The first mode of operation is a transmit-receive mode of operation where the beam is steerable to interact with one or more wellbore components at a first angle and the second mode of operation is a pulse echo mode of operation where the beam interacts with the one or more wellbore components at a second angle different from the first angle.

16 Claims, 18 Drawing Sheets

(52) U.S. Cl.
CPC ............. *G01V 2210/1429* (2013.01); *G01V 2210/6222* (2013.01); *G01V 2210/6226* (2013.01); *G01V 2210/63* (2013.01)

(58) Field of Classification Search
CPC ....... G01V 2210/6226; G01V 2210/63; G01V 2210/6169; G01V 1/46; G01V 1/40; E21B 47/005; E21B 47/0025; E21B 47/085
See application file for complete search history.

(56) References Cited

U.S. PATENT DOCUMENTS

| | | | |
|---|---|---|---|
| 5,757,191 A * | 5/1998 | Gianzero | G01V 3/28 |
| | | | 324/343 |
| 6,088,294 A * | 7/2000 | Leggett, III | E21B 44/00 |
| | | | 175/45 |
| 6,483,777 B1 | 11/2002 | Zeroug | |
| 7,035,165 B2 * | 4/2006 | Tang | E21B 47/026 |
| | | | 367/28 |
| 7,663,969 B2 | 2/2010 | Tang et al. | |
| 7,697,375 B2 | 4/2010 | Reiderman | |
| 9,772,308 B2 | 9/2017 | Davydov et al. | |
| 9,816,373 B2 | 11/2017 | Howell et al. | |
| 10,253,615 B2 | 4/2019 | Hunter et al. | |
| 10,359,374 B2 | 7/2019 | Guo et al. | |
| 10,364,664 B2 | 7/2019 | Hori et al. | |
| 10,605,944 B2 | 3/2020 | Han | |
| 10,705,056 B2 | 7/2020 | Lei et al. | |
| 10,781,690 B2 | 9/2020 | Malik et al. | |
| 10,884,158 B2 | 1/2021 | Kasten et al. | |
| 2004/0158404 A1 * | 8/2004 | Gaston | G01V 1/44 |
| | | | 702/6 |
| 2009/0000859 A1 | 1/2009 | Wang | |
| 2009/0231954 A1 | 9/2009 | Bolshakov et al. | |
| 2011/0080806 A1 | 4/2011 | Normann | |
| 2016/0138390 A1 * | 5/2016 | Arntsen | E21B 7/043 |
| | | | 175/45 |
| 2017/0090057 A1 | 3/2017 | Thierry et al. | |
| 2017/0152967 A1 | 6/2017 | Jaffrey et al. | |
| 2017/0335685 A1 | 11/2017 | Breaux | |
| 2018/0372902 A1 | 12/2018 | Han et al. | |
| 2020/0150304 A1 | 5/2020 | Han et al. | |
| 2020/0199999 A1 | 6/2020 | Cooper et al. | |
| 2020/0300077 A1 | 9/2020 | Matuszyk et al. | |
| 2021/0247538 A1 | 8/2021 | Guedes | |

OTHER PUBLICATIONS https://www.merriam-webster.com/dictionary/proximate (Year: 2024).*
International Search Report and Written Opinion mailed Oct. 5, 2022 in corresponding PCT Application No. PCT/US2022/031268.
Hua Wang et al., "The wavefield of acoustic logging in a cased-hole with a single casing—Part I: a monopole tool," 2018, Geophysical Journal International, vol. 212, pp. 612-626.

* cited by examiner

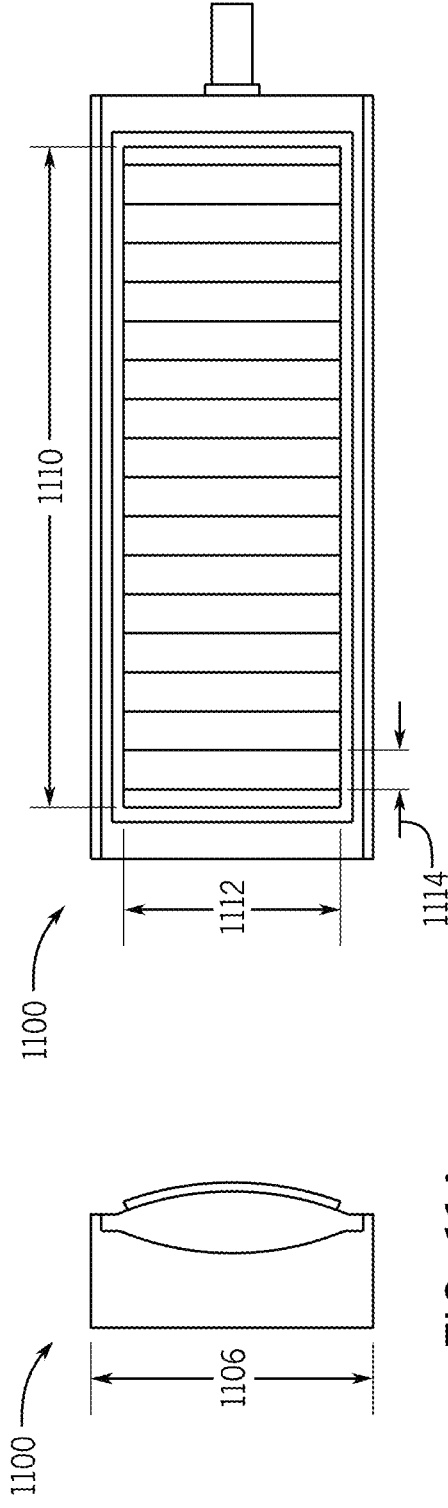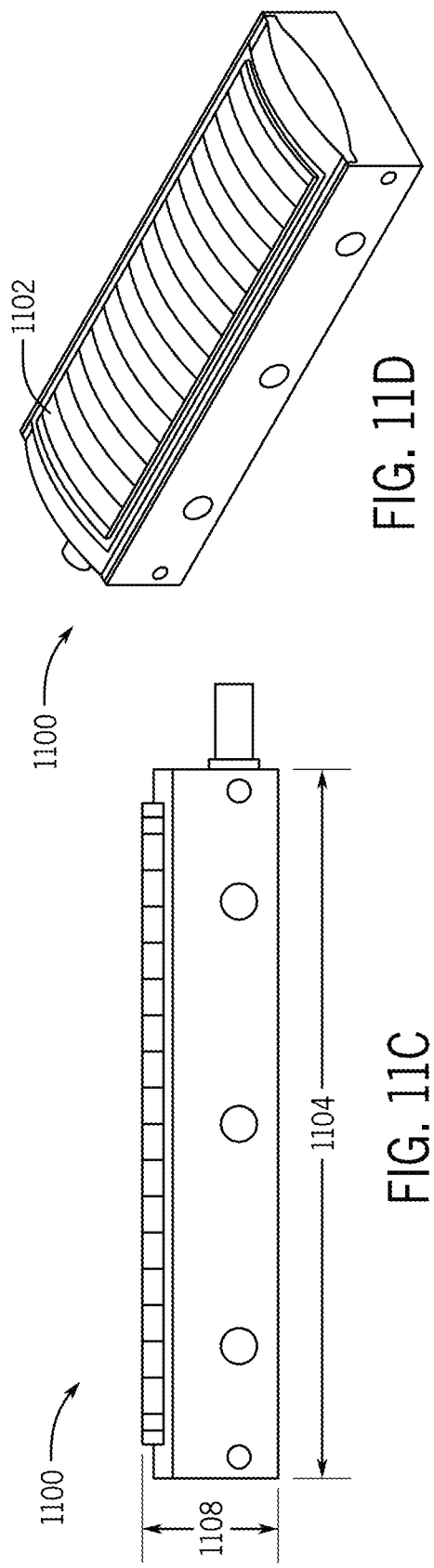
FIG. 11A  FIG. 11B  FIG. 11C  FIG. 11D

ACOUSTIC PHASED ARRAY SYSTEM AND METHOD FOR DETERMINING WELL INTEGRITY IN MULTI-STRING CONFIGURATIONS

CROSS-REFERENCE TO RELATED APPLICATIONS

This application claims priority to and the benefit of U.S. Provisional Patent Application No. 63/195,914 filed on Jun. 2, 2021 and titled "AN ACOUSTIC PHASED ARRAY SYSTEM AND METHOD FOR DETERMINING WELL INTEGRITY IN MULTI-STRING CONFIGURATIONS," the full disclosure of which is hereby incorporated in its entirety for all purposes.

BACKGROUND

1. Field of the Disclosure

The present disclosure relates to a system and method for acoustic measurement systems. Specifically, the present disclosure relates to determining well integrity in multi-string configurations.

2. Description of Related Art

Oil and gas production may involve downhole measurement operations where various sensors are utilized to collect data for determining one or more wellbore properties. For acoustic sensing operations, an acoustic transmitter may emit a signal and an acoustic receiver may receive the signal after it gets reflected or refracted from the wellbore. Acoustic waves may have insufficient energy to penetrate multiple layers of downhole material, such as various tubing layers, fluid layers, cement layers, casing layers and the like, which generally leads to a multi-physics approach of a variety of services in order to generate sufficient data for wellbore inspection.

SUMMARY

Applicant recognized the limitations with existing systems herein and conceived and developed embodiments of systems and methods, according to the present disclosure, for improved acoustic measurement systems.

In an embodiment, an acoustic logging system includes a first transducer configured to emit a beam of acoustic energy according to a first mode of operation or a second mode of operation. The system also includes a second transducer or a set of transducers, positioned axially away from the first transducer, configured to receive acoustic energy from a wellbore environment responsive to the beam. The system further includes a damper shoe arranged between the first transducer and the second transducer or a set of transducers. The first mode of operation is a transmit-receive mode of operation where the beam is steerable to interact with one or more wellbore components at a first angle and the second mode of operation is a pulse echo mode of operation where the beam interacts with the one or more wellbore components at a second angle different from the first angle.

In an embodiment, an acoustic logging system utilizes a method for transmitting and receiving sound energy through a sound barrier in a wellbore environment so that enough energy is available for making measurements of objects behind the barrier includes a first transducer in contact with or in close proximity to the sound barrier configured to emit a beam of acoustic energy according to a first mode of operation or a second mode of operation. The system also includes a second transducer or a set of second transducers in contact with or in close proximity to the sound barrier, positioned axially away from the first transducer, configured to receive acoustic energy from a wellbore environment responsive to the beam. The system further includes a damper shoe arranged between the first transducer and the second transducer or set of second transducers. The first mode of operation is a transmit-receive mode of operation where the beam is steerable to interact with one or more wellbore components at a first angle and the second mode of operation is a pulse echo mode of operation where the beam interacts with the one or more wellbore components at a second angle different from the first angle.

In an embodiment, an acoustic logging system utilizes a method for transmitting and receiving sound energy through a sound barrier in a wellbore environment so that enough energy is available for making measurements of objects behind the barrier includes a first transducer in contact with or in close proximity to the sound barrier configured to emit a beam of acoustic energy according to a first mode of operation or a second mode of operation. The system also includes a second transducer or a set of second transducers in contact with or in close proximity to the sound barrier, positioned axially away from the first transducer, configured to receive acoustic energy from a wellbore environment responsive to the beam. The first mode of operation is a transmit-receive mode of operation where the beam is steerable to interact with one or more wellbore components at a first angle and the second mode of operation is a pulse echo mode of operation where the beam interacts with the one or more wellbore components at a second angle different from the first angle.

In an embodiment, an acoustic logging system utilizes a method for transmitting and receiving sound energy through a sound barrier in a wellbore environment so that enough energy is available for making measurements of objects behind the barrier. The system includes a first transducer in contact with or in close proximity to the sound barrier configured to emit a beam of acoustic energy according to a first mode of operation or a second mode of operation. The system also includes one or more second transducers in contact with or in close proximity to the sound barrier, positioned axially away from the first transducer, configured to receive acoustic energy from a wellbore environment responsive to the beam. The first mode of operation is a transmit-receive mode of operation where the beam is steerable to interact with one or more wellbore components at a first angle and the second mode of operation is a pulse echo mode of operation where the beam interacts with the one or more wellbore components at a second angle different from the first angle.

In an embodiment, a system includes a downhole tool configured to be conveyed into a wellbore using a conveyance system, the downhole tool to be arranged within an annulus formed within at least one tubular positioned within the wellbore. The system also includes an acoustic system forming at least a portion of a plurality of portions the downhole tool. The acoustic system includes a body portion. The acoustic system also includes a first transducer associated with the body portion, the first transducer having a plurality of transducer elements configured to transmit an acoustic signal responsive to a control signal, wherein each transducer element of the plurality of transducer elements can independently transmit the respective acoustic signal. The acoustic system further includes a second transducer associated with the body portion, wherein the second transducer is arranged at an axially farther location along the body portion such that the first transducer is closer to an uphole position than the second transducer.

In an embodiment, a method for acquiring acoustic data includes determining, using a first mode of operation, a tubular orientation. The method also includes adjusting, based at least in part on the tubular orientation, at least one of a frequency or a steering angle for a transducer. The method further includes transmitting, via the transducer operating in a second mode of operation, an acoustic wave. The method also includes determining, based at least in part on a data signal associated with the acoustic wave, one or more wellbore properties.

BRIEF DESCRIPTION OF DRAWINGS

The present technology will be better understood on reading the following detailed description of non-limiting embodiments thereof, and on examining the accompanying drawings, in which:

FIG. 11A is a side view of an example of an acoustic transducer, in accordance with embodiments of the present disclosure;

FIG. 11B is a top view of an example of an acoustic transducer, in accordance with embodiments of the present disclosure;

FIG. 11C is a front view of an example of an acoustic transducer, in accordance with embodiments of the present disclosure;

FIG. 11D is a perspective view of an example of an acoustic transducer, in accordance with embodiments of the present disclosure;

DETAILED DESCRIPTION

Figure 1A:
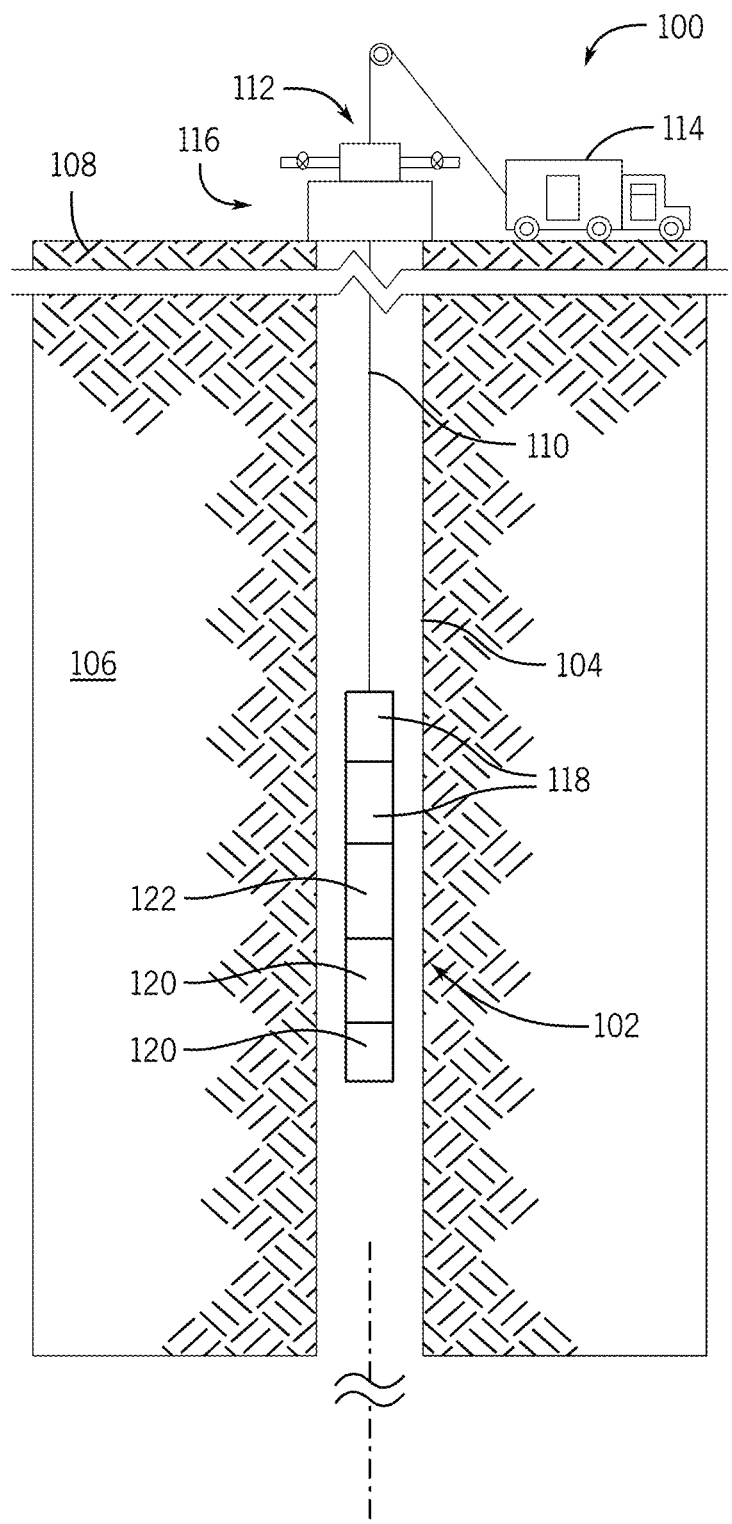
FIG. 1A is a cross-sectional side view of an embodiment of a wellbore system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, references numerals may be reused for similar features between figures, however, such use is not intended to be limiting and is for convenience and illustrative purposes only.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed to oilfield equipment for evaluating well integrity in multi-layered wells, such as cemented oil and gas wells with multiple concentric casing and tubing elements. In one or more embodiments, downhole logging systems and methods are disclosed for generation and detection of acoustic waves to identify material, such as cement, water, oil or natural gas between layers of downhole components, determine dimensions, and generate images of cavities and delaminations in annular spaces containing cements. Multi-string cement integrity is challenging where barrier elements such as tubing introduce high acoustic energy attenuation and a need arises to incorporate significantly advanced and different sensor configurations to sense second order effects. Embodiments describe an acoustic phased array system to generate and sense acoustic waves, such as Lamb waves, through multi-strings to characterize annular cement defects. It should be appreciated that while embodiments may be described with reference to oil and gas wells that various other embodiments may be directed toward a variety of other downhole applications, including carbon dioxide sequestration wells, natural gas or oil storage wells in salt domes, or any other application where well integrity is crucial to operation and downhole inspection may be utilized.

Embodiments of the present disclosure generate and detect acoustic waves in multiple strings, such as through tubing, for cement quality determination. This overcomes problems with existing tools that may be unable to receive signals through tubing while maintaining sufficiently high quality readings to make wellbore determinations. Furthermore, various embodiments enable the frequency spectrum and phasing of the acoustic signals to be adjusted in real time or near-real time (e.g., without significant delay) for tuned operation in casing and tubing of different thicknesses without changing the acoustic transducers. Furthermore, various embodiments enable the frequency spectrum and phasing of the acoustic signals to be adjusted in real time or near-real time (e.g., without significant delay) for tuned operation in highly attenuating drilling fluids without changing the acoustic transducers. Additionally, various embodiments enable concurrent operation of pulse-echo and transmit-receive modalities with a single array.

Embodiments of the present disclosure may further enable tuning of the frequency spectrum and phasing of the transmit and receive arrays independently, thereby enabling selection and optimization of transmission and reception. Additionally, concurrent measurements of tubing offset and cement quality may be conducted using a common array that enables concurrent operation of pulse-echo and transmit-receive modalities. Furthermore, various embodiments of the present disclosure include a dampening system between the transmit and receiver arrays to attenuate direct acoustic waves between the transmit and receive arrays.

One or more embodiments of the present disclosure address and overcome the inability to determine cement quality and cement defects through tubing in multiple string wells with acoustic modalities due to the approximately 20 to 30 dB attenuation in transmit and 20 to 30 dB attenuation in receive cycles. These problems are addressed by steering a wave front through the annular fluid between the tubing and the first casing and generating Lamb modes in the casing on the fly by an appropriate (e.g., particularly selected) choice of frequency spectrum and phasing in the downhole transmit acoustic array. Similarly, selection of the frequency spectrum and phasing may also be applied to the receiver array to optimize the sensitivity of the received signal. Moreover, a common array may operate in the pulse-echo mode to determine tubing offset and annular fluid thickness and utilize that information to tune the frequency and phasing in real or near-real time (e.g., without significant delay).

Embodiments of the present disclosure may include systems and methods for acoustic analysis, such as acoustic wellbore analysis. These systems may be deployed on one or more tools or tool strings, which may be utilized in downhole environments in accordance with one or more methods. Various embodiments include tool configuration that include two or more receivers, two or more acoustic sources, or two or more transducer. It should be appreciated that embodiments may include a single source and multiple receivers, multiple sources and a single receiver, or any combination thereof. Furthermore, various embodiments may incorporate one or more transducers that may be used to both generate and/or receive acoustic signals. Various embodiments may include one or more mechanical arms, such as an arm that rotates about a pivot responsive to a spring force or a motor drive, to drive the one or more transducer radially outward and away from a tool body an in close proximity with a tubular body. In various embodiments, the one or more transducers directly contact the tubular body. In various embodiments, the one or more transducers are not in direct contact with the tubular body. The one or more transducers may be closely positioned to or in close proximity to the tubular body, such as within approximately 0.5 inches of the tubular body. It should be appreciated that the one or more transducers may be closer or further away, such as the one or more transducers may be in close proximity to the tubular body when positioned less than 0.9 inches from the tubular body.

As will be described below, various embodiments incorporate a phased array that includes a plurality of elements. These phased array, or each of the elements individually, may be tilted or rotated, for example responsive to a control signal, in order to help steer an emitted beat of acoustic energy. For example, each element, a grouping of elements, or the entire array may be associated with one or more motors or drive elements that apply a force to a portion of the element/array to tilt or otherwise adjust a position of the element/array relative to an axis. While embodiments may be described with respect to a phased array, it should be appreciated that various embodiments may incorporate additional elements, such as piezoelectric elements, and still provide operation within the scope of the present disclosure.

In at least one embodiment, the phased arrays of the present disclosure may include both a frequency and a steering angle, where one or both may be adjusted during operations (e.g., "on the fly"). For example, during operations, one or more acoustic signals may be transmitted and then received at a receiver. Based on one or more properties of this signal, a control signal may adjust one or more properties of the phased array in order to tune or otherwise adjust the emitted and received signals. Such a configuration may be advantageous in off-center tubulars, where the tubular is tilted or slanted. In various embodiments, the transducer may operate in a pulse echo mode in order to measure the configuration of the tubular (e.g., whether the tubular is centered or not) and then the frequency and/or steering angle may be adjusted based, at least in part, on the information obtained from that pulse echo measurement. This enables optimization based on different wellbore properties.

Various embodiments may also be used to generate one or more acoustic images. Traditional systems may deploy a downhole imager, such as a camera, but the resolution or picture may be poor due to impurities in the well. Embodiments may overcome these problems by obtaining an acoustic image, such as an ultrasonic image, using the phased arrays. Accordingly, embodiments may provide multiple different potential methods to obtain information from a downhole environment.

FIG. 1A is a schematic cross-sectional view of an embodiment of a wellbore system 100 including a downhole tool 102 arranged within a wellbore 104 formed in a formation 106. The downhole tool 102 is lowered from a surface location 108 via a conveyance system, such as the illustrated wireline 110, which is shown by way of example only and it should be appreciated that embodiments may be utilized with different conveyance systems. In various embodiments, the electric wireline may transmit electric signals and/or energy from the surface location 108 into the wellbore, for example to provide operational power for the tool 102 and/or to transmit data, such as data obtained from sensors arranged on the tool 102. In various embodiments, the tool 102 may be utilized to perform downhole operations, such as measurement operations, by way of example. It should be appreciated that embodiments exist where the downhole tool 102 is deployed with any other type of conveyance means, including coiled tubing, pipes, cable, and slickline. That is, embodiments of the present disclosure may be utilized in other scenarios.

The wellbore system 100 includes a wellhead assembly 112, shown at an opening of the wellbore 104, to provide pressure control of the wellbore 104 and allow for passage of equipment into the wellbore 104, such as the cable 110 and the tool 102. In this example, the cable 110 is a wireline being spooled from a service truck 114. The wellhead assembly 112 may include a blowout preventer (BOP) 116 (e.g., pressure control device).

In various embodiments, the downhole tool 102 is a logging or measurement tool, such as an acoustic logging tool that includes a series of subs or modules coupled together. In this example, a receiver array 118 is arranged uphole from a transmitter array 120 with a dampener 122 arranged between the receiver array 118 and the transmitter array 120. It should be appreciated that this arrangement is for example purposes only and is not intended to limit the scope of the present disclosure. For example, in one or more embodiments, the dampener 122 may be omitted. Furthermore, there may be more or less receivers and transmitters. Additionally, in at least one embodiment, transducers may be utilized that may both generate and receive acoustic signals.

Certain operations may be referred to as open hole logging where the source (e.g., transmitter array) emits a signal as the tool 102 is brought to the surface. The receiver array may detect signals from the source, such as reflected or refracted waves, and information from the waves may be processed, either downhole or uphole, to determine one or more wellbore characteristics. Such systems may be utilized to determine porosity or the like of the formation, which may be useful for determining potential recovery.

Figure 1B:
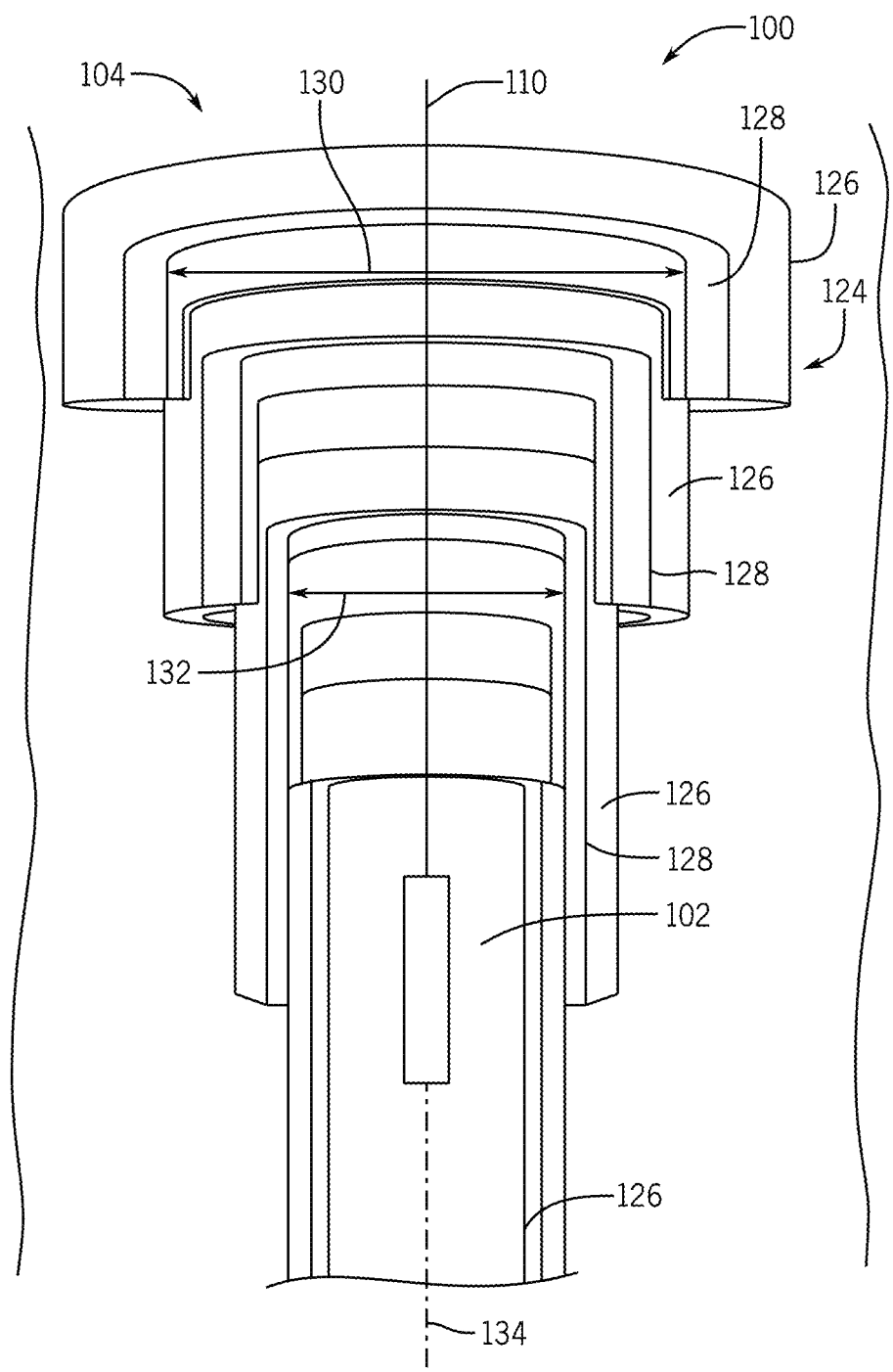
FIG. 1B is a cross-sectional side view of an embodiment of a wellbore system, in accordance with embodiments of the present disclosure.

FIG. 1B is a partial sectional view of the wellbore system 100 illustrating a multi-barrier well structure 124 and the downhole tool 102. In various embodiments, the tool 102 may be utilized to detect abnormalities or potential defects within the wellbore 104. In the illustrated embodiment, the downhole tool 102 may include one or more acoustic logging devices, as described above, which may include one or more transceiver arrays and/or receiver arrays. The acoustic logging system may interrogate the formation 106 to determine properties of the formation and/or the components of the multi-barrier well structure 124.

In the illustrated embodiment, the well structure 124 includes a series of tubular casings 126, which may be metallic, and cement walls 128 between the casings 126. Often, when drilling hydrocarbon wells, a first wellbore diameter 130 is larger than a second wellbore diameter 132. In other words, as the wellbore 104 gets deeper, the diameter decreases. In various embodiments, the wellbore 104 may be cased, as in, lined by the tubular casings 126 and held into place against the formation 106 and/or other casing sections via cement forming the cement walls 128. It may be desirable to inspect the integrity of the casing 126 and/or the cement walls 128, for example for potential abnormalities or defects such as mud channel defects, bonding defects, air voids, defects in the casing, eccentricity of the well. In various embodiments, the defects may be categorized such as such as annulus defects, casing defects, casing eccentricity, cement bonding defects, and fluid channel defects, among others. These abnormalities or defect may be referred to as wellbore characteristics and may further include additional information such as formation properties and the like.

In the illustrated embodiment, the tool 102 traverses into the wellbore 104 along a wellbore axis 134 supported by the wireline 110, which may be a cable reinforced for wellbore operations and further including conductive materials to transfer energy and data signals. It should be appreciated that while a wireline system is illustrated in FIG. 1B, embodiments of the present disclosure may be disposed on rigid tubing, coiled tubing, and with various other wellbore tubing structures. In various embodiments, the tool 102 can determine the integrity of each of the barriers (e.g., casings) of the multi-barrier well and/or the plurality of annuli between the barriers. The tool 102 is deployed at the different depths inside the wellbore 104, and therefore has material and structural integrity to withstand the high pressures and high temperatures at these depths.

Various multi-barrier wells may be shut in or otherwise decommissioned at end of life. Accordingly, the barriers (e.g., casing and cement walls) may be inspected prior to shut in or decommissioning to determine whether additional operations will be useful to ensure the integrity of the wellbore. These wells often have additional tubing within them, such as production tubing, which may form another barrier for tools, such as acoustic tools, to attempt to obtain information through. Embodiments of the present disclosure may be directed toward one or more phased arrays that enable measurements through multiple tubing or barrier layers in order to determine one or more characteristics of the wellbore, such as cement integrity.

Figure 2:
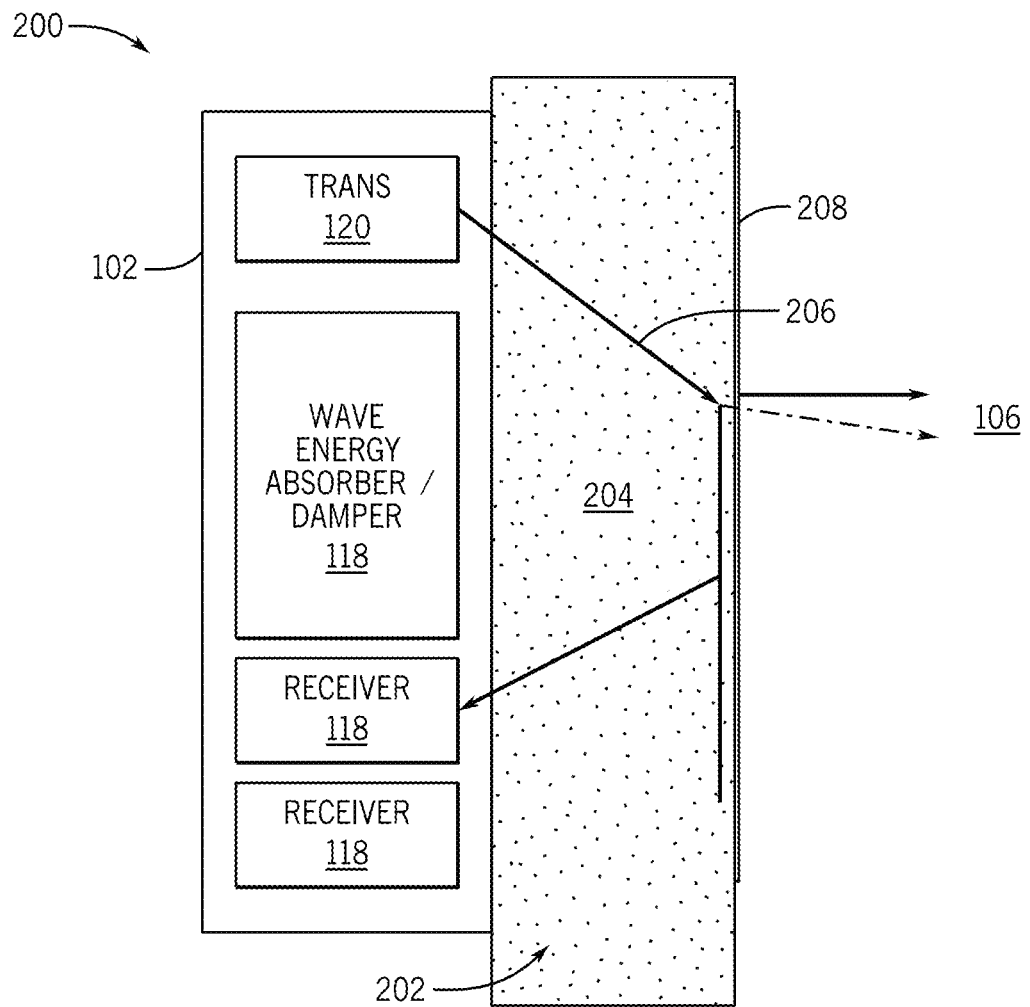
FIG. 2 is a cross-sectional side view of an embodiment of an acoustic logging system, in accordance with embodiments of the present disclosure.

FIG. 2 is a schematic diagram of an example of a downhole data acquisition environment 200 where one or more acoustic systems are utilized to obtain data may be utilized to determine one or more formation properties, for example based, at least in part, on an acoustic signal. In this example, the tool 102 is arranged within an annulus 202, which is filled with fluid 204. The transmitter 120 emits one or more signals 206 (e.g., a wave) outwardly from the body of the tool 102 (e.g., in a radially outward direction with respect to an axis of the wellbore). The signal 206 may interact with one or more components, such as the fluid 202 or a sidewall 208. While this arrangement may work in an open hole, a cased hole presents different challenges by positioning a barrier, such as tubing, between the wall 208 and the tool 102, which attenuates the signal 206. Systems and methods of the present disclosure are directed toward one or more phased arrays to enable detection through a multi-barrier or multi-wall arrangement. As noted herein, it should be appreciated that various embodiments may include or more fewer components. By way of example, in one or more embodiments, the damper 122 may be omitted.

Figure 3:
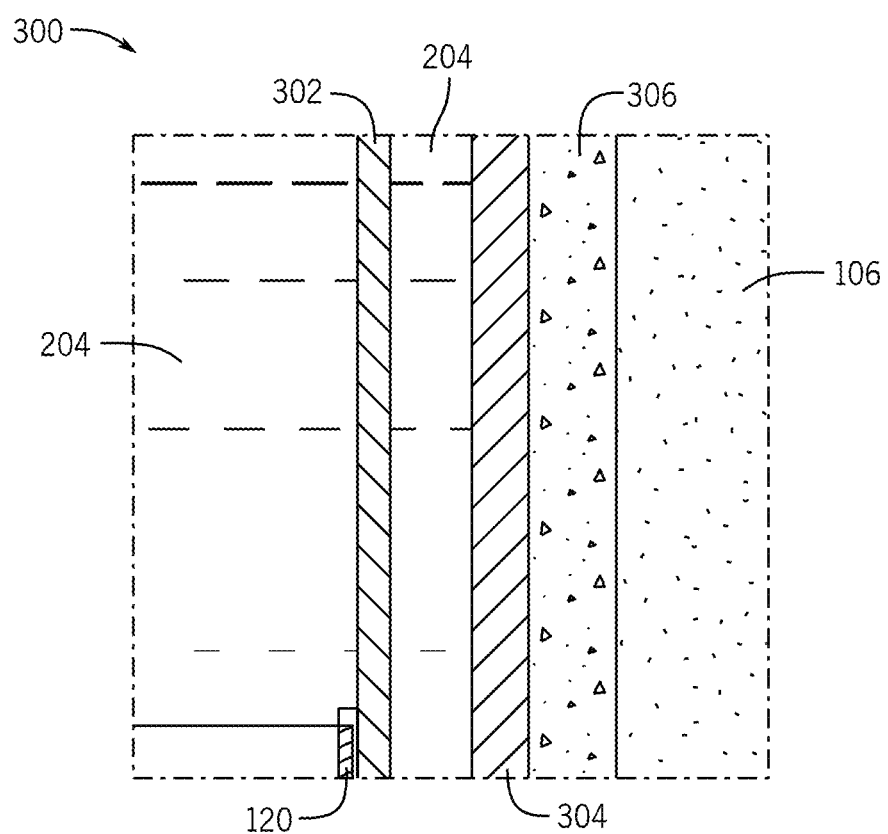
FIG. 3 is a schematic representation of a multi-layer acoustic logging operation, in accordance with embodiments of the present disclosure.

FIG. 3 illustrates a schematic diagram of a two-dimensional (2D) flat plate model 300 illustrating one or more challenges addressed and overcome by the present disclosure. As shown in this example, the tool (not visible) may include one or more arms (not shown) to position the transducer 120 (e.g., transmitter) close to or against tubing 302, which may be production tubing, casing, or any other reasonable tubular positioned within the wellbore. Signals that are transmitted from the transducer 120 may, therefore, be absorbed and attenuated by the tubing 302, as described above. However, in this example, inspection of the secondary casing 304 and/or the cement 306 may be desirable. Accordingly, systems and methods are directed toward a phased array that enables inspection of the secondary casing 304 and/or cement 306 through the tubing 302, as well as through intermediate fluids 204, such as water. These systems and methods may overcome various problems associated with such measurements, such as energy losses of approximately 20 to 30 dB (e.g., approximately an order of magnitude or more) during operation in such environments. As a result, energy received may be so small (e.g., have peaks with small amplitudes) that they are indistinguishable from noise, with a very low signal-to-noise ratio (SNR), thereby preventing sufficient measurements.

Figure 4:
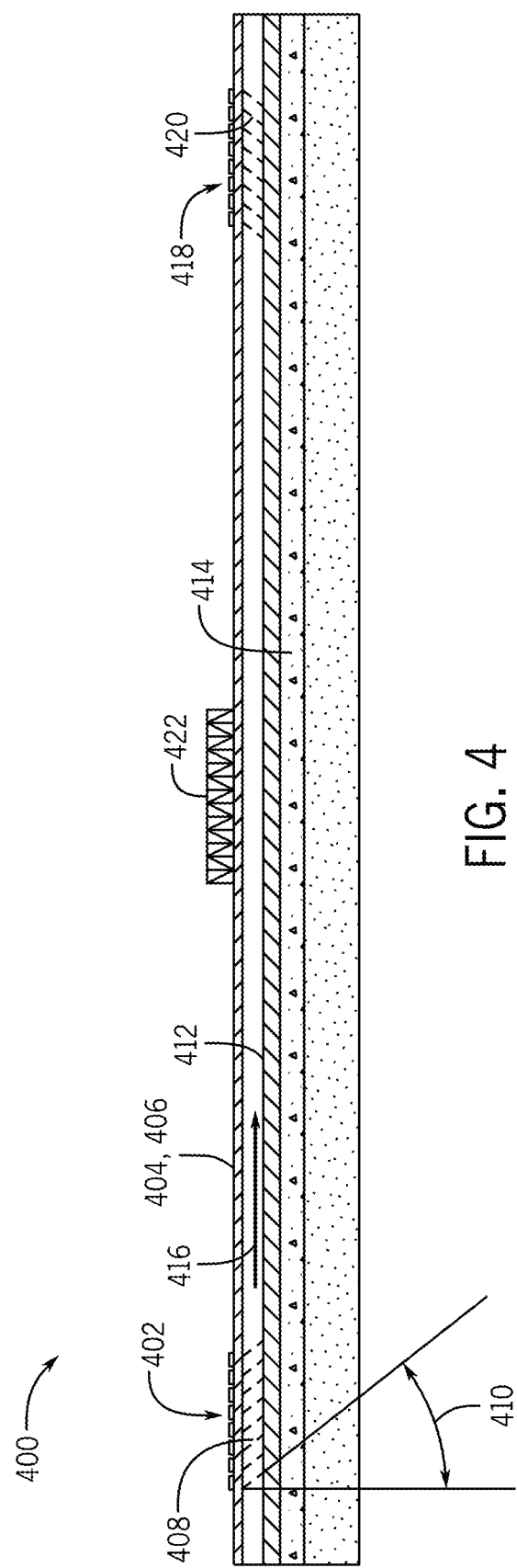
FIG. 4 is a schematic diagram of an embodiment of an acoustic system, in accordance with embodiments of the present disclosure.

FIG. 4 is a schematic diagram of an embodiment of an acoustic system 400 that utilizes one or more embodiments of the present disclosure. In this example, a phased array may steer one or more beams toward a formation to thereby enabling transmission of energy through an intermediate absorbing layer, such as tubing or casing. As will be described below, steering may be performed in one or more different directions. In this example, a transducer 402 (e.g., an array of transducers, a transducer array, etc.) is positioned along a body 404 of an acoustic measurement tool 406. The transducer 402 may be fixedly mounted to the body 404 and/or may be associated with one or more mechanical components, such as arms, that may drive the transducer 402 radially outward and away from the body 404. The transducer 402 may also be referred to as a steerable transducer that is configured to emit a phase-steered beam optimized or particularly calibrated for Lamb waves on casing. This wave may be steerable due to the timing between firing on sequential transmitters of the transducer array. In this example, the transducer 402 emits a wave 408 (e.g., beam). For example, the speed of the firing sequence of individual elements on an array may change an angle 410 of the wave (shown collectively as a series of lines), as will be described below. In one or more embodiments, the angle 410 may be changed in real or near-real time, for example by adjusting the firing sequence, which may adjust how the wave interacts with casing 412 and/or cement 414. Such changes may be directed via one or more control signals and may be responsive to analysis, or at least partial analysis, of one or more received signals to tune or otherwise adjust the wave 408. In this manner, utilization of the transducer 402 may be adjusted based on one or more operating conditions to enable improved operations of the tool 406. An attenuation of the Lamb mode propagating parallel to the axis in the casing may be calculated in a similar manner as described in U.S. Pat. No. 7,663,969 to Baker Hughes Inc., which is hereby incorporated by reference.

As shown in this example, the transducer 402 is pressed against an interior of the body 404, for example via one or more arms or the like positioned on a back side of the transducer 402, which has been removed for clarity with the present discussion. Additionally, in one or more embodiments, the transducer 402 may be mounted directly against the body 404. Furthermore, in various embodiments, the transducer 402 may be mounted exterior of the body 404 and may be positioned in close proximity to a wellbore tubular and/or the casing 412. A control signal may induce emission from individual transducers 402 to generate the wave 408, which in this example is emitted at the angle 410 toward the casing 412. In operation, a leaky lamb wave 414 may be transmitted along the casing and then received at a receiver 418 (e.g., receiver array, array of receivers). It should be appreciated that the single receiver 418 is shown by way of example and there may be more receivers 418. Additionally, the receiver 418 may be part of a transducer that is capable of both generating and emitting signals. As shown, the angle 410 and/or a different angle may be present in a receiving wave 420 (e.g., beam), which may be a reflected or refracted wave. One or more embodiments of the present disclosure therefore enable Lamb A0 mode waves to be generated on casing, through both tubing and fluid (e.g., water), and moreover, to be received with adequate sensitivity to determine cement condition.

The illustrated embodiment further includes a damper shoe 422, which may be a solid, heavy material to absorb sound. In one or more embodiments, the damper shoe 422 is arranged between the transmitter 402 and the receiver 418 to block or absorb sound waves that travel through the body 404. It should be appreciated that the damper may be positioned at an intermediate location between the transmitter 402 and the receiver 418 and that this position may be particularly selected based on operating conditions or the like. For example, the damper shoe 422 may be at a midpoint, closer to the transmitter 402, or closer to the receiver 418. Furthermore, there may be more than one damper 422. Additionally, in one or more embodiments, the damper shoe may be omitted. Accordingly, it should be appreciated that embodiments without the damper shoe fall within the scope of the present disclosure and that additional components may be added or removed within the scope of the present disclosure.

Figure 5:
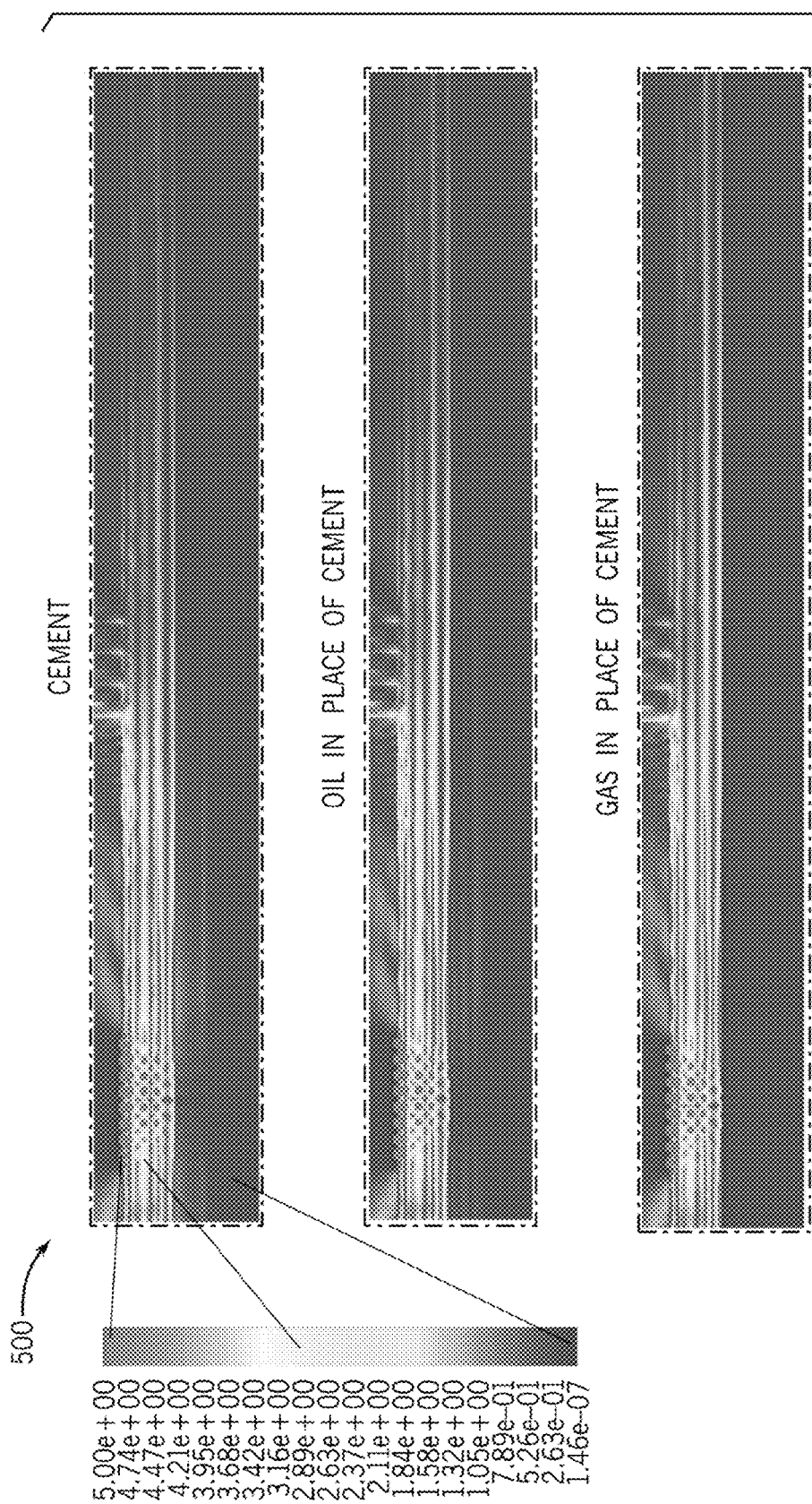
FIG. 5 is a representation of an example of acoustic logging data, in accordance with embodiments of the present disclosure.

FIG. 5 is a set of representations 500 illustrating Lamb A0 modes being visible on the casing, even after penetrating through a layer of tubing and/or fluid. By way of example only, the upper representation 500 illustrates a visible lamb mode in the casing. When compared to the middle and bottom representations 500, distinct changes are visible where the cement is replaced by oil or gas, thereby providing an indication of whether or not the cement's integrity is maintained. Furthermore, in this example, the damper shoe is shown as effectively absorbing the waves.

Figure 6A:
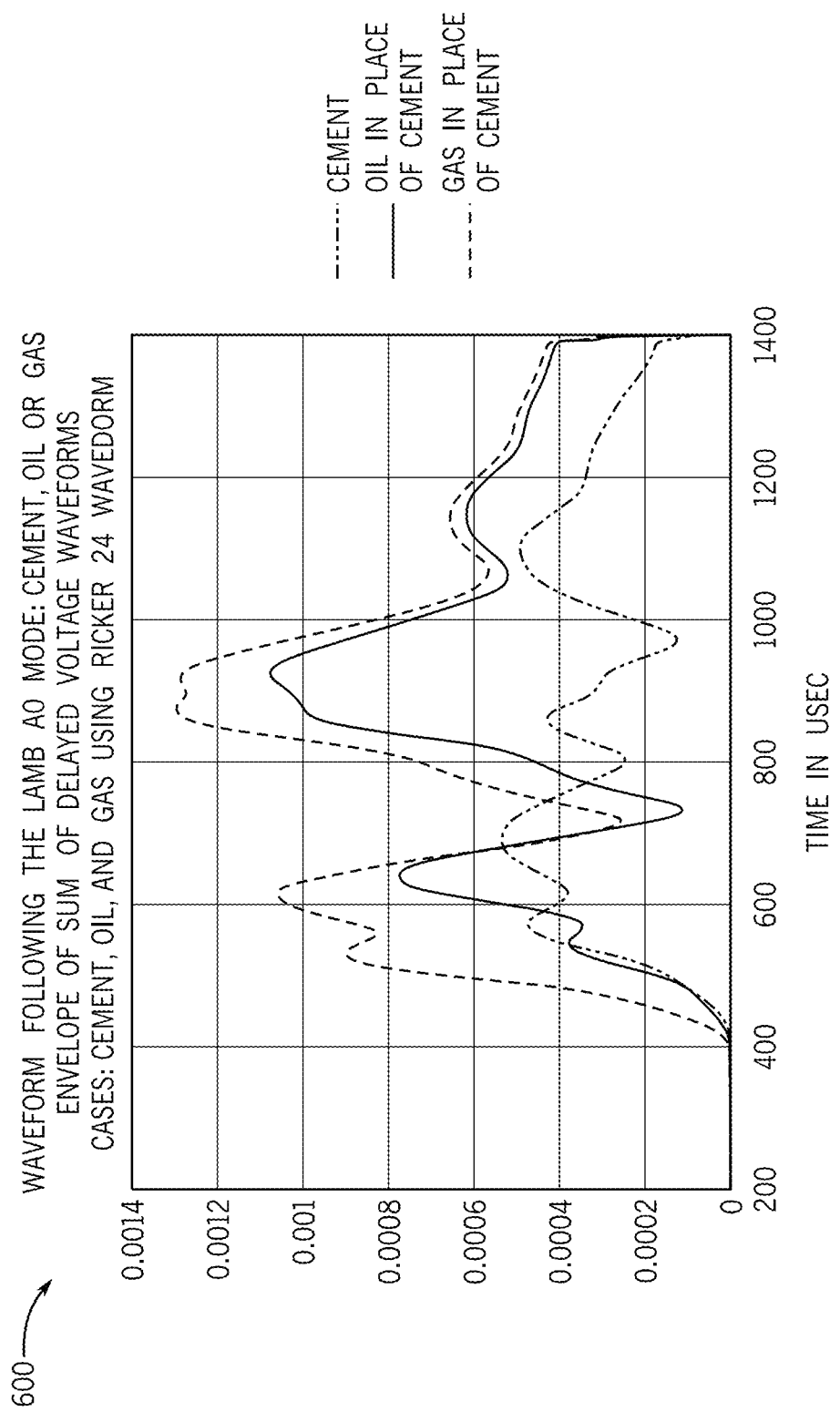
FIGS. 6A-6C are graphical representations of examples of acoustic logging data, in accordance with embodiments of the present disclosure.
Figure 6B:
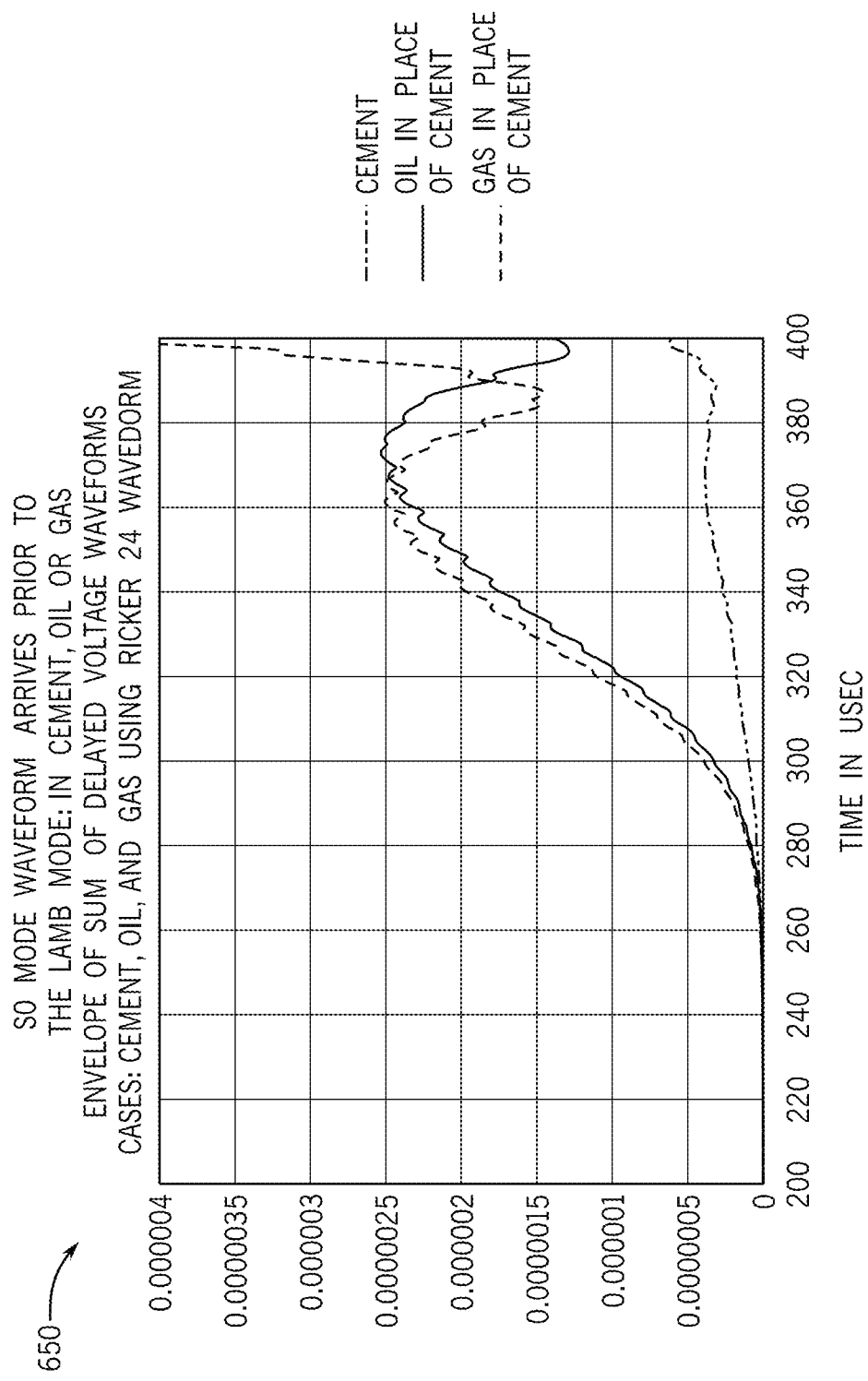
Figure 6C:
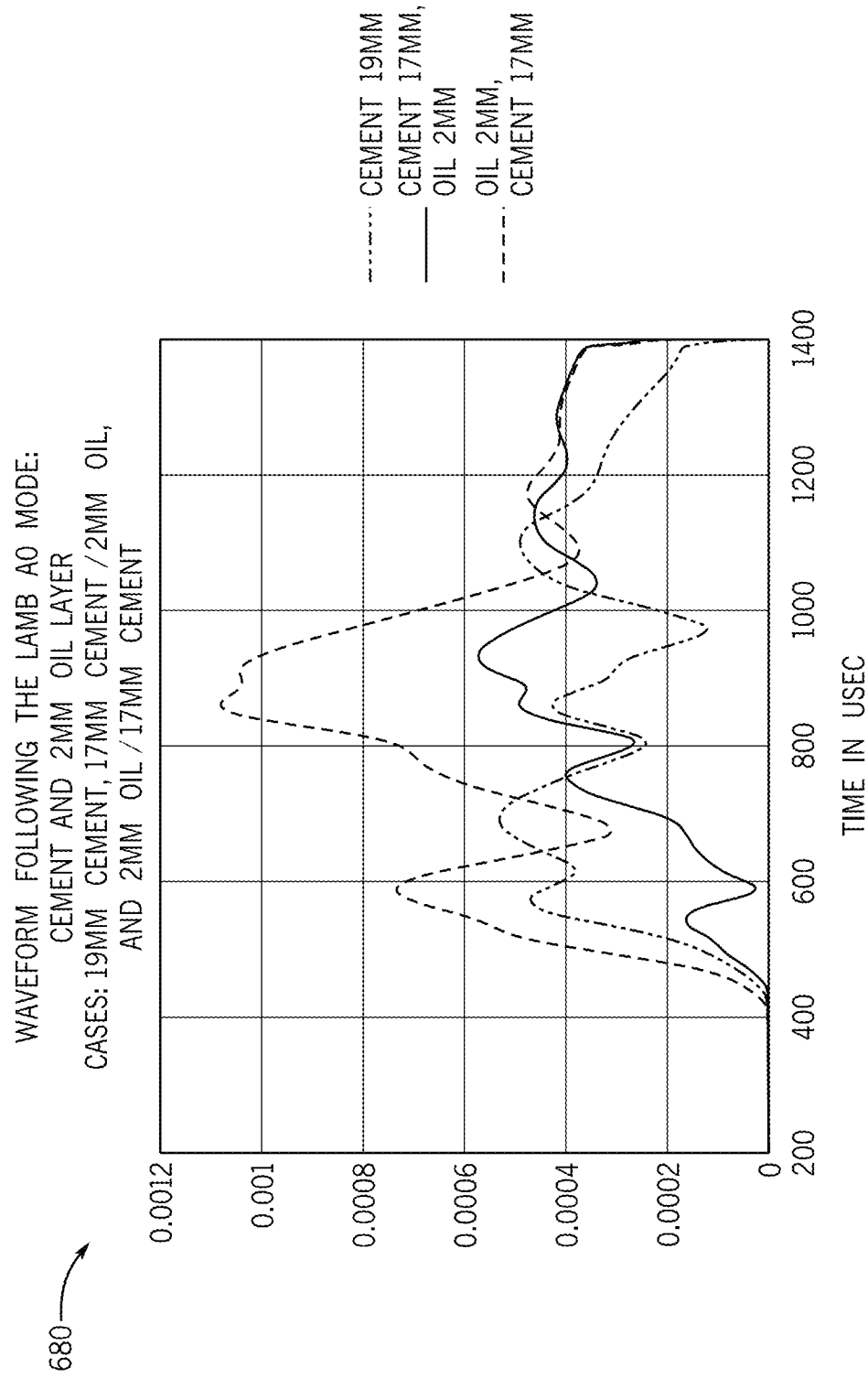

FIGS. 6A-6C are graphical representations 600, 650, 680 of the effect of the cement condition using the acoustic interrogation models described above. As illustrated in these examples, the symmetric Lamb S0 mode travels faster than the asymmetric A0 mode, hence it arrives earlier. However, the S0 does not propagate as well on an asymmetrically loaded metal surface such as the casing. The A0 mode propagates well and is sensitive to the loading material outside the casing. In these representations 600, 650, 680 it is shown that there are distinct, measurable changes in the received signal envelope when oil or gas are substituted for cement (e.g., where cement integrity is reduced). By way of example only, the representation 600 illustrates peaks at locations where cement is low and oil and/or gas are high. Such measurements may be used to provide a correlation between locations of thinning cement along a length of a wellbore.

Accordingly, embodiments of the present disclosure illustrate that Lamb A0 mode waves can be generated on casing through tubing and water. Furthermore, embodiments illustrate that Lamb A0 mode waves can be received from casing through tubing and water. Additionally, embodiments illustrate that Lamb A0 mode provides adequate sensitivity to cement conditions. Furthermore, embodiments illustrate that Lamb A0 provides adequate sensitivity to the presence of thin oil layers on either side of the cement. Accordingly, embodiments of the present disclosure may be utilized for cement evaluation.

Figure 7:
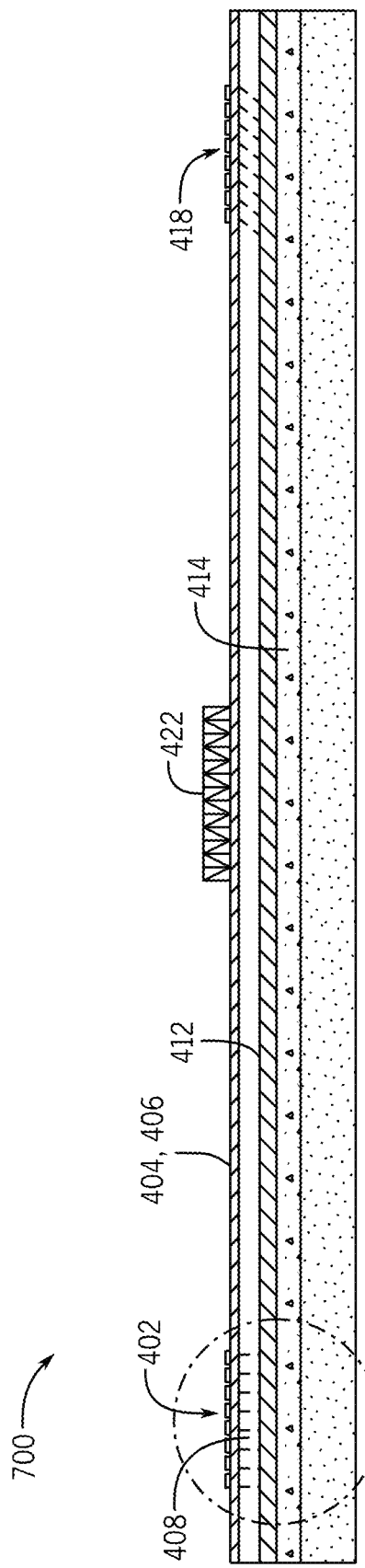
FIG. 7 is a schematic diagram of an embodiment of an acoustic system, in accordance with embodiments of the present disclosure.

FIG. 7 is a schematic diagram of an embodiment of an acoustic system 700 that utilizes one or more embodiments of the present disclosure. It should be appreciated that the acoustic system 700 may share one or more components with the acoustic system 400 and, moreover, may be the same system that is configured to operate in a different mode. Accordingly, for convenience, like numbering may be utilized, but such numbering is not intended to limit the scope of the present disclosure and different configurations may utilize different components, more or fewer components, or operate in different ways.

In this example, the transducer 402 is operational such that each transducer of the array is powered at the same or substantially the same time, thereby providing a substantially straight (e.g., 90 degrees from the body 404) wave 408. As a result, operation may be in the form of a pulse-echo mode, as opposed to the Lamb wave evaluation model described with respect to FIG. 4. Advantageously, this may be accomplished using the same transducer 402 and receiver 418 configuration, thereby enabling multiple operations with the same tooling configurations.

Figure 8:
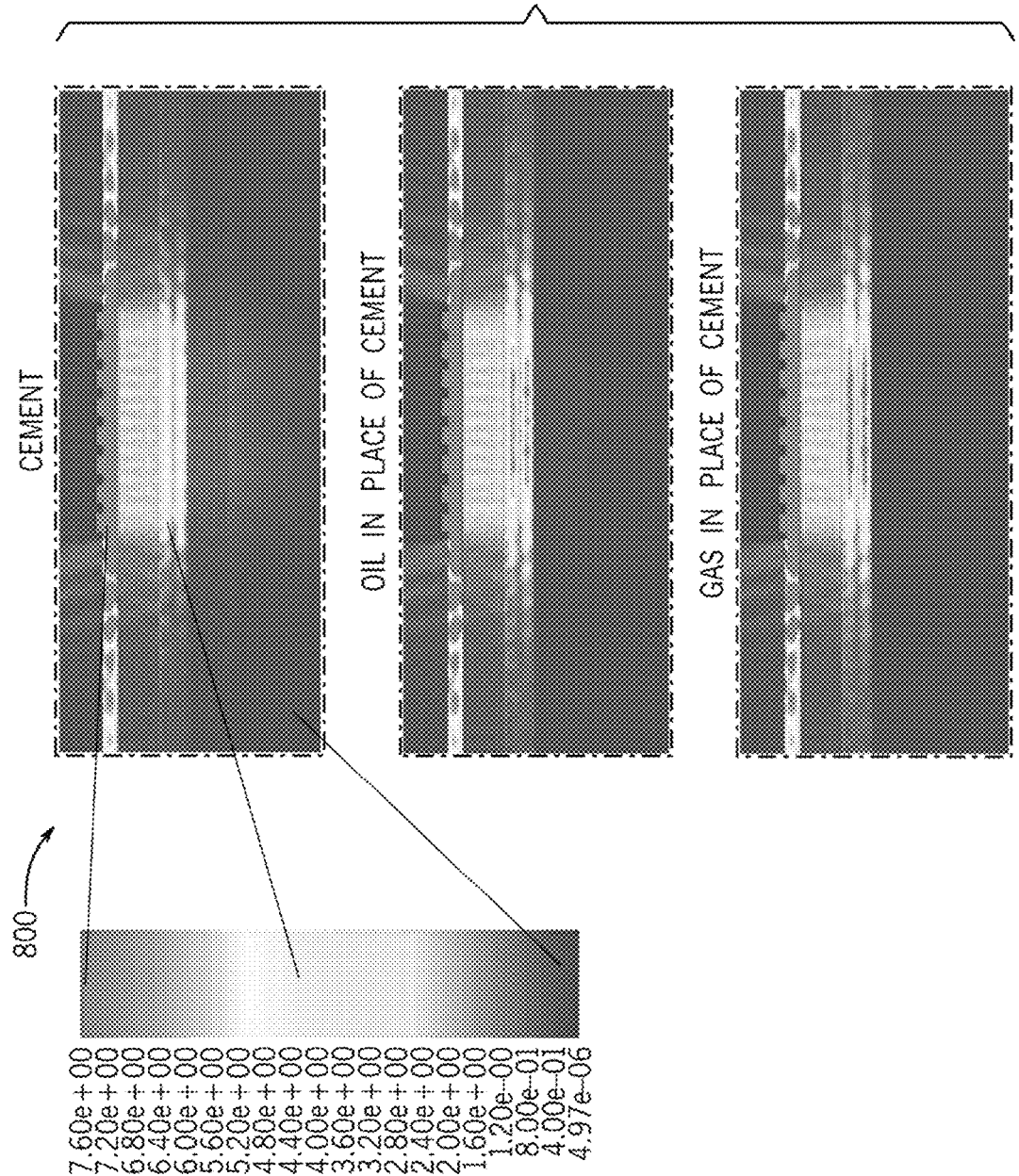
FIG. 8 is a representation of an example of acoustic logging data, in accordance with embodiments of the present disclosure.

FIG. 8 is a set of representations 800 illustrating operation in the pulse-echo mode where pressure levels are visible on casing or cement, but not (or only faintly) on oil, gas, or rock. By way of example only, the upper representation 800 illustrates a visible pressure level in the casing. When compared to the middle and bottom representations 800, distinct changes are visible where the cement is replaced by oil or gas, thereby providing an indication of whether or not the cement's integrity is maintained.

Figure 9:
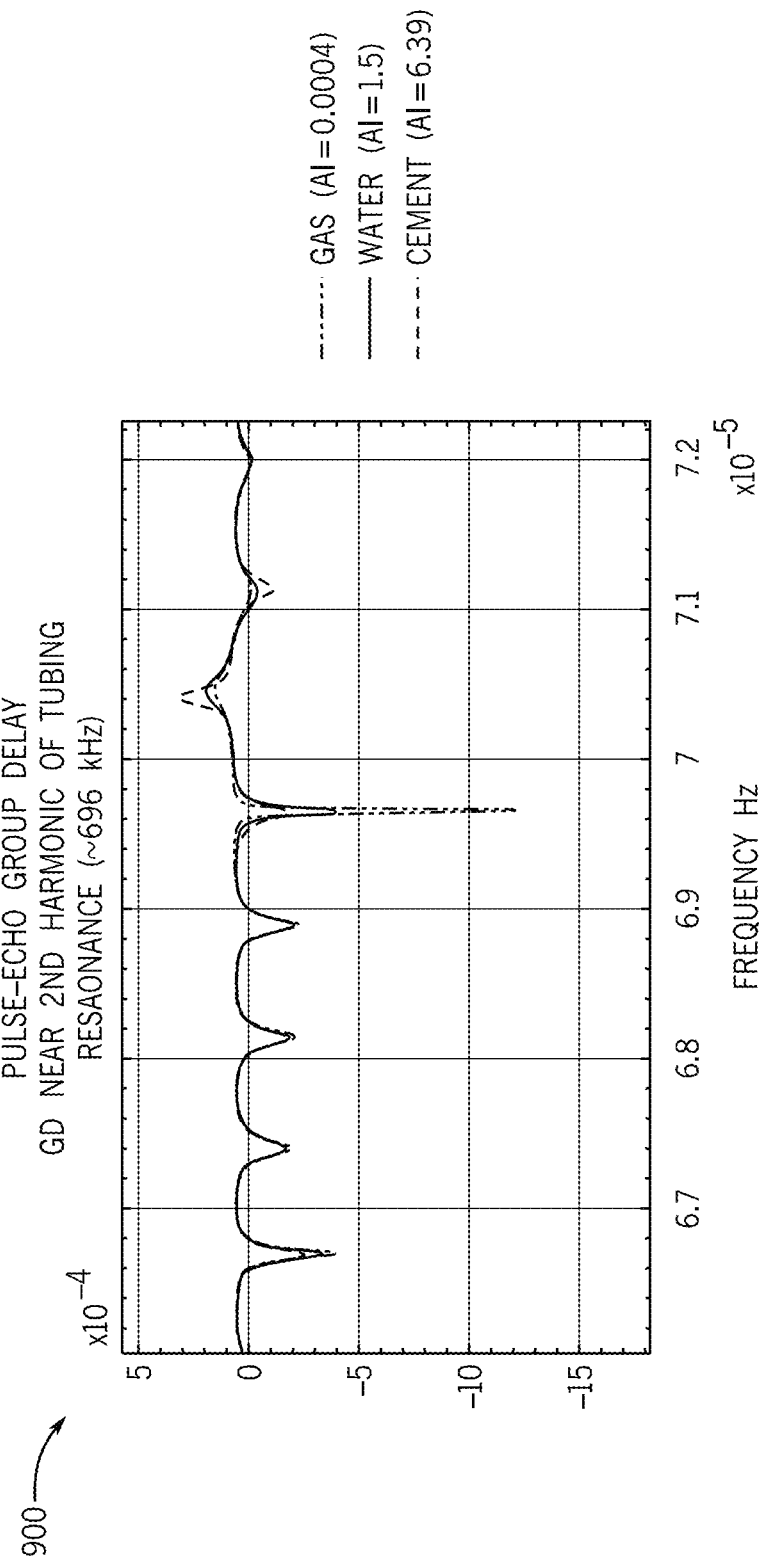
FIG. 9 is graphical representations of an example of acoustic logging data, in accordance with embodiments of the present disclosure.

FIG. 9 is a graphical representation 900 of a pulse-echo spectra illustrating group delay (calculated as per description in the prior art Baker Hughes Patent Number: 5,491,668) inverted peaks in accordance with embodiments of the present disclosure. As shown, there are measurable differences between locations with cement and those where cement is replaced by a liquid such as water or a gas such as natural gas produced from formations. Accordingly, as noted above, the configurations may be utilized in a variety of different ways to conduct different acoustic logging and measurement operations.

Embodiments of the present disclosure illustrate transmit-receive mode transducers that may be used for pulse-echo mode caliper measurements or pulse-echo mode cement quality measurements by calculating the through tubing casing impedance similar to a method described in J. Carlson et al, "An ultrasonic pulse-echo technique for monitoring the setting of CaSO4-based bone cement", Biomaterials 24 (2003) 71-77, 2002. Accordingly, the same transducers may be used in different modes to support caliper measurements (e.g., in pulse-echo mode) and cement characterization (e.g., in transmit-receive or pulse-echo modes). Furthermore, as noted above, the same transducers may also be utilized to perform ultrasonic imaging. In this manner, embodiments of the present disclosure provide improvements over existing tools where individual, singular tools are only utilize for a single type of data acquisition. Embodiments may enable improved operations with fewer trips and less equipment, thereby simplifying measurement operations.

Figure 10:
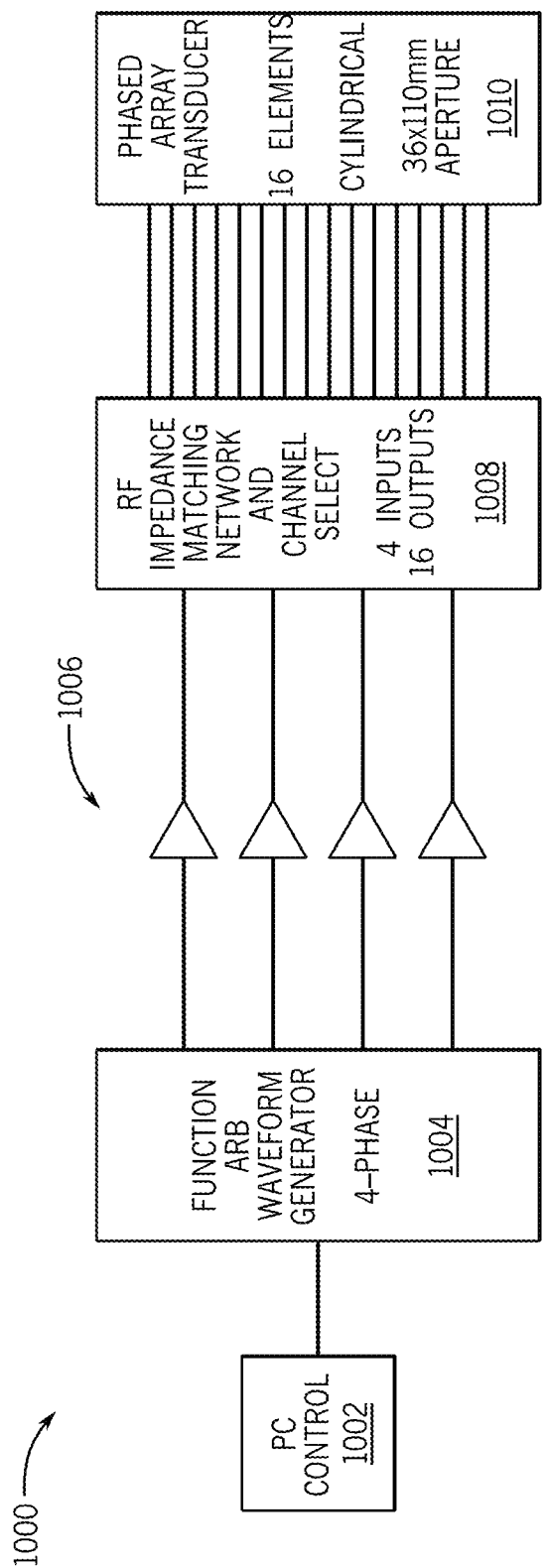
FIG. 10 is a schematic diagram of an example of an acoustic logging system, in accordance with embodiments of the present disclosure.

FIG. 10 is a schematic diagram of an embodiment of an acoustic system 1000 that may be utilized with one or more embodiments of the present disclosure. In this example, a controller 1002, which may include one or more processors and memories, may transmit instructions to a wave form generator 1004. In at least one embodiment, the memories store machine-readable instructions that, when executed by the processor, cause the controller 1002 to transmit instructions and/or perform one or more tasks. In this example, responsive to the instructions, the generator 1004 may generate one or more signals transmitted through a series of amplifier 1006. The signal may then be transmitted to a matching network 1006, which may be used to tune or otherwise calibrate the signals and/or operating parameters of the transducers and/or receivers. Thereafter, a transducer 1008, which may be a phased array transducer, may receive the signal and generate a wave or beam, such as those described above. In at least one embodiment, the phased array transducer 1008, as well as other components of the system 1000, are particularly selected to support transmit-receive mode and pulse-echo mode operations described above.

FIGS. 11A-11D illustrate views of an embodiment of a transducer 1100. FIG. 11A corresponds to a side view, FIG. 11B corresponds to a top view, FIG. 11C corresponds to a front view, and FIG. 11D corresponds to a perspective view. The illustrated transducer 1100 may be utilized with embodiments of the present disclosure, for example by being incorporated into one or more downhole tools and associated with one or more arms to positioning the transducer 1100 within a wellbore. In this example, the transducer 1100 is a transducer array that includes a plurality of elements 1102. While 16 elements are shown in this example, it should be appreciated that more or fewer may be utilized with various embodiments of the present disclosure. The illustrated transducer 1100 includes a body length 1104, a body width 1106, and a thickness 1108 which may be particularly selected based on one or more operating conditions. Furthermore, also illustrated are a transducer array length 1110, a transducer width 1112, and a transducer length 1114. As shown, the transducer 1100 may include a curved front end, which may facilitate pressing or otherwise positioning the transducer 1100 along a surface.

Figure 12:
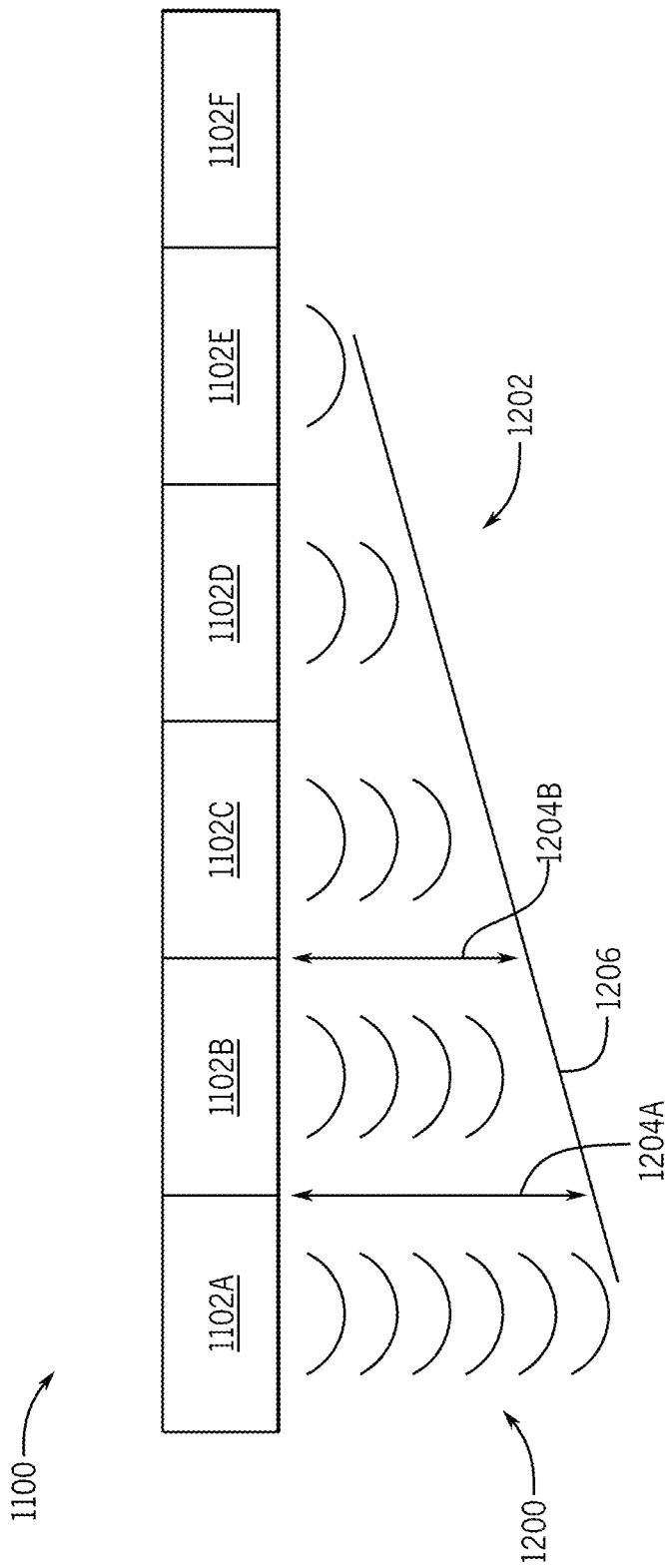
FIG. 12 is a schematic diagram of an embodiment of an acoustic logging operation, in accordance with embodiments of the present disclosure.

FIG. 12 is a schematic diagram of an embodiment of the transducer 1100 illustrating a plurality of elements 1102A-1102F emitting waves 1200 at different times in order to generate a steered wave 1202. It should be appreciated that FIG. 12 is provided for illustrative purposes and various features have been removed for clarity and conciseness. In this example, the elements 1102A-1102F may be configured to fire, for example based on instructions received from one or more controllers, at different times, such as at a time (ti), each of the elements 1102A-1102F (if waves have been emitted) have respective wave positions 1204 that are at differential axial lengths away from the transducer 1100. For example, the wave position 1204A associated with the first transducer 1102A is different from the wave position 1204B associated with the second transducer 1102B in an embodiment where the first transducer 1102A was fired first. Accordingly, a line 1206 may be representative of the steered beam directed into the tubing/casing/cement. It should be appreciated that how steep the line 1206 is may be particularly selected and adjusted based on one or more operating conditions. For example, if the time between emission of the elements 1102 is decreased, the wave will be less steep, if the time is increased, the wave will be more steep.

In this manner, embodiments of the present disclosure enable beam steering through a barrier such as a tubing to provide systems and methods that permit the emitted waves or beams to contact the casing at a critical angle to generate a Lamb wave. It should be appreciated that different sizes of casing or tubing may generate improved signals with different angles or frequencies for the beams. Accordingly, operations may be adjusted in real or near-real time based on feedback received from one or more sensors regarding the operational characteristics of the acoustic tool. As such, a method may include emission of a beam or wave, evaluation of the reflection to determine generation of a Lamb wave, and then adjustment if a Lamb wave is not generated. This may be an iterative process, or a database may be consulted that may store operating conditions based on different wellbore properties, such as casing thickness, fluid properties, and the like.

Figure 13B:
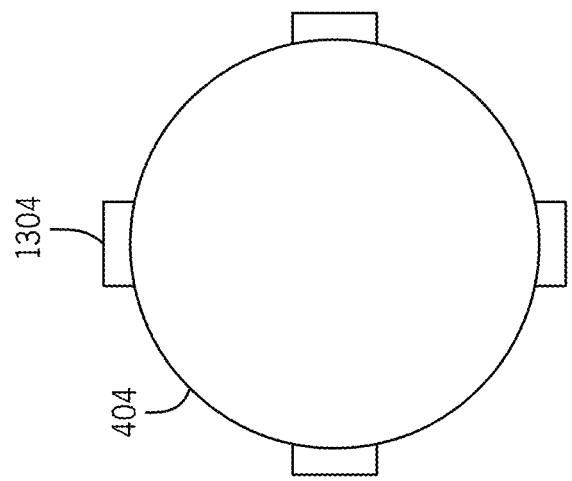
FIG. 13B is schematic top view of an embodiment of an acoustic logging tool, in accordance with embodiments of the present disclosure.
Figure 13A:
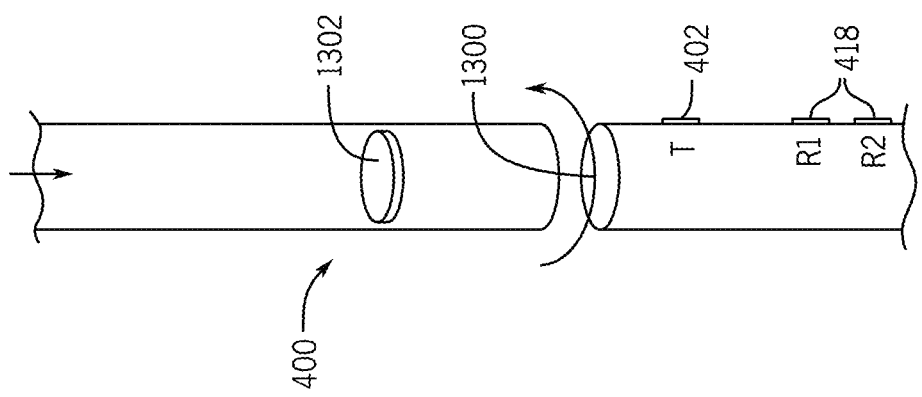
FIG. 13A is a schematic view of an embodiment of an acoustic logging tool, in accordance with embodiments of the present disclosure.

Various embodiments of the present disclosure may be mounted on a tool body that is configured to rotate about an axis of the wellbore. FIG. 13 is a schematic diagram of an embodiment of the acoustic system 400 where the transducer 402 and the receivers 418 are arranged exterior to the body 404, such as on a surface of the body 404, where the components may further be associated with arms to drive radially outward away from the body 404. In this example, the body 404 is coupled, via a shaft 1300 or the like, to a motor 1302 for driving rotation of the body 404. In this manner, an azimuthal resolution may be obtained by correlating data received from the tool with different azimuthal positions of the transducer 402 and/or the receivers 418. In various embodiments, different rotational speeds may be used, such as approximately 8 revolutions per minute, but the revolution may be faster or slower, such as less than 6 revolutions per minute, more than 4 revolutions per minute, between 2 and 10 revolutions per minute, or any other reasonable speed to obtain wellbore data.

It should be appreciated that multiple sets of transducers/receivers may be positioned along the body 404. For example, as shown in the top view of FIG. 13B, there may be multiple sets 1304 of transducers and/or receivers arranged at different circumferential positions along the body 404. For example, various embodiments may include two sets positioned 180 degrees apart, three sets positioned 120 degrees apart, four sets positioned 90 degrees apart, or any other reasonable configuration or number of sets. Such an arrangement may provide improved azimuthal resolution and enable more coverage of the wellbore in shorter periods of time and/or with fewer trips.

Figure 14B:
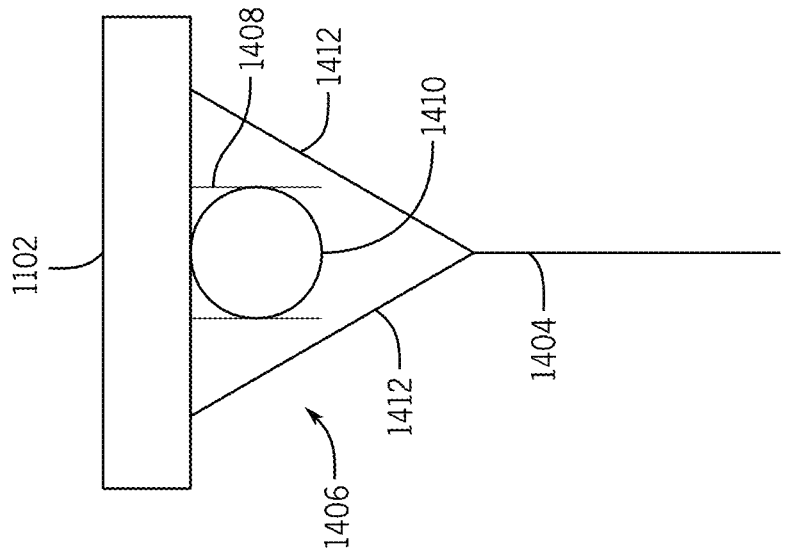
FIG. 14B is a schematic cross-sectional view of an embodiment of multi-axis joint associated with a transducer, in accordance with embodiments of the present disclosure.
Figure 14A:
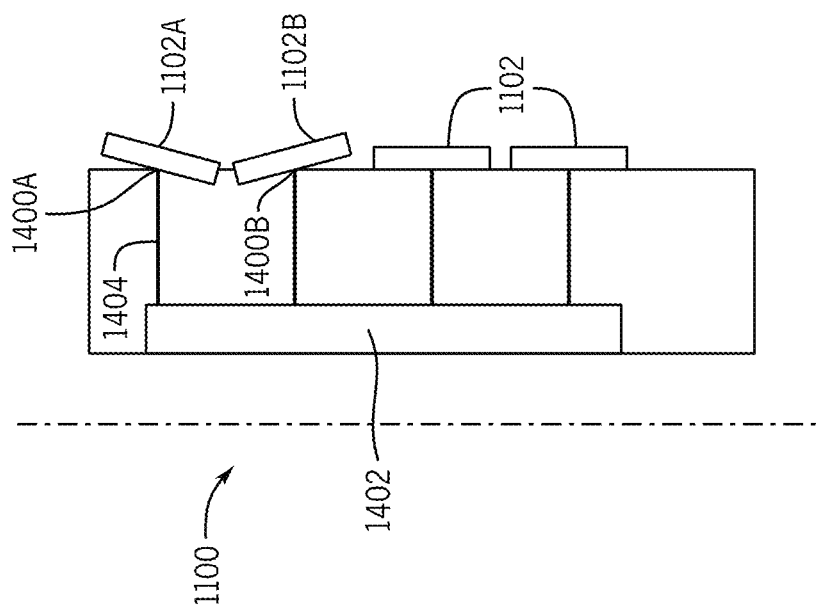
FIG. 14A is a schematic cross-sectional view of an embodiment of a transducer, in accordance with embodiments of the present disclosure.

FIG. 14A is a schematic cross-sectional side view of an embodiment of the transducer 1100 illustrating elements 1102 that may be pivoted about a respective element axis 1400 (which in this example extends into the plane of the page). In this example, a driving mechanism 1402, which may include components such as a motor, gears, lever arms, and the like, may include an activator link 1404 coupled to individual elements 1102. In this example, the activator link 1404 may apply a force to the elements 1102, thereby causing the elements 1102 to rotate about respective element exes 1400. For example, the element 1102A is driven to rotate in a clockwise direction about the axis 1400A. However, the element 1102B is driven to rotate in a counterclockwise direction about the axis 1400B. As shown, each of the elements 1102 are individually controllable, thereby providing maximum flexibility in steering the elements 1102, and as a result, the output acoustic waves. It should be appreciated that groups of elements 1102 may be collectively moved, for example pairs may be moved instead of individual elements.

In various embodiments, a multi-axis joint 1406 may be utilized to couple the elements 1102 to the activator link 1404. For example, the multi-axis joint 1406 may include a ball and socket joint that allows for pivoting/rotation in a variety of different directions, thereby providing improved flexibility for steering the beam. As shown in the schematic cross-sectional view of FIG. 14B, the element 1102 may be mounted on the multi-axis joint 1406 where a sleeve 1408 is arranged to pivot about a ball 1410. Link arms 1412 may extend from the activator link 1404, which may receive a force input, such as from the driving mechanism 1402, to permit rotation about the ball 1410 in a variety of different directions, thereby permitting steering of the waves emitted from the element 1102. It should be appreciated that the multi-axis joint 1406 is provided as a non-limiting example and that various other embodiments may include different configurations, which may or may not be multi-axis joints, including but not limited to, MYO joints, ball joints, slot joints, reduced slot joints, distance joints, prismatic joints, hinge joints, cylindrical joints, screw joints, planar joints, and the like.

Figure 15:
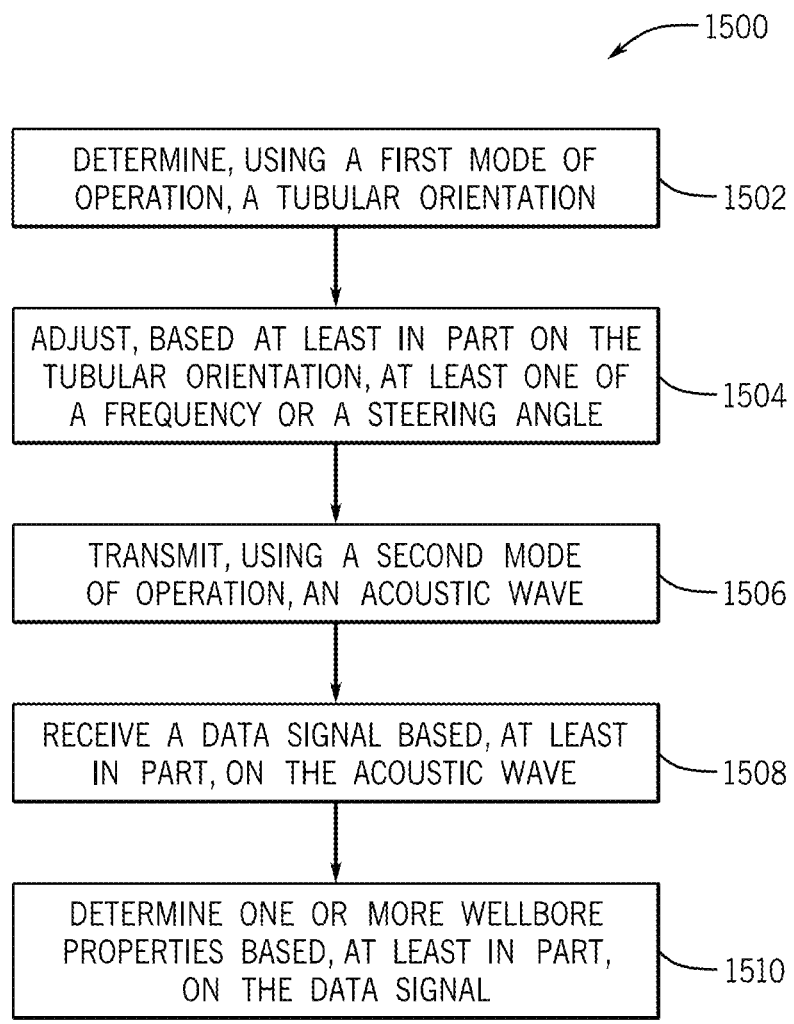
FIG. 15 is a flow chart of an embodiment of a process for acoustic data acquisition, in accordance with embodiments of the present disclosure.

FIG. 15 is a flow chart of an embodiment of a process 1500 for performing a downhole measurement. It should be appreciated that for this process, and all processes described herein, that there may be more or fewer steps. Additionally, the steps may be performed in a different order, or in parallel, unless otherwise specifically stated. In this example, a tubular orientation is determined using a first mode of operation 1502. For example, as noted above, a pulse-echo mode may be utilized in order to determine a tubular orientation. The determination of the tubular orientation may be used to adjust one or more properties of an acoustic tool 1504, such as adjustments to frequency or to a steering angle. For example, one or more acoustic elements may be tilted or shifted based on the orientation of the tubular. In at least one embodiment, a second mode of operation may be used to transmit an acoustic wave 1506. The second mode of operation may correspond to a phased array that uses elements to transmit acoustic waves at different times to generate a shaped or otherwise steered wave. A data signal may be acquired based, at least in part, on this acoustic wave 1508, such as receiving a signal corresponding to a reflection off a borehole wall. The data signal may be used to determine one or more wellbore properties 1510, such as to determine whether there is damage to concrete between casing layers, among other options. In this manner, acoustic measurements may be used within a wellbore, which may include a multi-barrier system, in order to inspect various parameters of the wellbore in order to use the information to determine follow on actions.

The foregoing disclosure and description of the disclosed embodiments is illustrative and explanatory of various embodiments of the present disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. An acoustic logging system utilizing a method for transmitting and receiving sound energy through a sound barrier in a wellbore environment so that enough energy is available for making measurements of objects behind the sound barrier, comprising:
   a first transducer configured to emit a beam of acoustic energy according to a first mode of operation or a second mode of operation; and
   one or more second transducers, positioned axially away from the first transducer, configured to receive acoustic energy from the wellbore environment responsive to the beam;

wherein the first mode of operation is a transmit-receive mode of operation where the beam is steerable, when emitted from the first transducer, to interact with one or more wellbore components at a first angle and the second mode of operation is a pulse echo mode of operation where the beam, when emitted from the first transducer, interacts with the one or more wellbore components at a second angle different from the first angle.

2. The acoustic logging system of claim 1, wherein the first transducer comprises a plurality of transducer elements.

3. The acoustic logging system of claim 1, further comprising:
a damper shoe arranged between the first transducer and the one or more second transducers.

4. The acoustic logging system of claim 1, wherein the at least one of the first transducer or the one or more second transducers are positioned less than 0.9 inches from the sound barrier.

5. The acoustic logging system of claim 1, wherein the at least one of the first transducer or the one or more second transducers are positioned approximately 0.5 inches from the sound barrier.

6. The acoustic logging system of claim 2, wherein the plurality of transducer elements are operable at different times, wherein operation at different times is configured to produce a steerable beam.

7. The acoustic logging system of claim 6, wherein a steepness of the steerable beam is based, at least in a part, on a firing sequence of the plurality of transducer elements.

8. The acoustic logging system of claim 7, wherein an amplitude value is calculated.

9. The acoustic logging system of claim 7, wherein a transit time value is calculated.

10. The acoustic logging system of claim 7, wherein a spectral characteristic value is calculated.

11. The acoustic logging system of claim 7, wherein an attenuation value is calculated from the transmit-receive mode.

12. The acoustic logging system of claim 7, wherein an impedance value is calculated from the pulse-echo mode.

13. The acoustic logging system of claim 7, wherein an amplitude value, a transit time value, a spectral characteristic value, an attenuation value, and an impedance value are calculated and used in any combination to characterize a cement quality.

14. A method for acquiring acoustic data, comprising:
determining, using a first mode of operation, a tubular orientation;
causing, based at least in part on the tubular orientation, physical movement of one or more acoustic elements configured to transmit an acoustic wave;
adjusting, based at least in part on the tubular orientation, at least one of a frequency or a steering angle for a transducer of at least one of the one or more acoustic elements;
transmitting, via the transducer operating in a second mode of operation, an acoustic wave; and
determining, based at least in part on a data signal associated with the acoustic wave, one or more wellbore properties.

15. The method of claim 14, further comprising:
receiving, at a receiver axially spaced away from the transducer, the data signal.

16. The method of claim 14, wherein the one or more wellbore properties correspond to at least one of a cement quality, a cement defect, or a tubular defect.

* * * * *